United States Patent
Zhao et al.

(10) Patent No.: US 12,193,045 B2
(45) Date of Patent: Jan. 7, 2025

(54) WIRELESS COMMUNICATION METHOD, TERMINAL DEVICE, AND STORAGE MEDIUM

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 272 days.

(21) Appl. No.: 17/711,827

(22) Filed: Apr. 1, 2022

(65) Prior Publication Data
US 2022/0225342 A1  Jul. 14, 2022

Related U.S. Application Data

(63) Continuation of application No. PCT/CN2019/109803, filed on Oct. 2, 2019.

(51) Int. Cl.
*H04W 72/10* (2009.01)
*H04W 72/04* (2023.01)
(Continued)

(52) U.S. Cl.
CPC ....... *H04W 72/56* (2023.01); *H04W 72/0473* (2013.01); *H04W 72/20* (2023.01); *H04W 72/542* (2023.01); *H04W 92/18* (2013.01)

(58) Field of Classification Search
CPC . H04W 72/56; H04W 72/0473; H04W 72/20; H04W 72/542; H04W 72/569;
(Continued)

(56) References Cited

U.S. PATENT DOCUMENTS

| 2012/0129540 A1* | 5/2012 | Hakola | ................. H04W 72/23 455/450 |
| 2015/0249981 A1* | 9/2015 | Wu | ....................... H04L 1/0026 370/329 |

(Continued)

FOREIGN PATENT DOCUMENTS

| CN | 106068670 A | 11/2016 |
| CN | 109644093 A | 4/2019 |

(Continued)

OTHER PUBLICATIONS

3GPP TSG-RAN WG2 Meeting 105 R2-1900155; Athens, Greece, Feb. 25-Mar. 1, 2019.
(Continued)

*Primary Examiner* — Candal Elpenord
(74) *Attorney, Agent, or Firm* — Young Basile Hanlon & MacFarlane, P.C.

(57) ABSTRACT

A wireless communication method, a terminal device, and a storage medium are provided. The wireless communication method includes the following. The terminal device determines a channel transmission state according to a priority of data or a signaling associated with a first channel and/or a priority of data or a signaling associated with a second channel in a case where the first channel conflicts with the second channel, where at least one of the first channel and the second channel transmits sidelink (SL) related information.

9 Claims, 5 Drawing Sheets

(51) Int. Cl.
   *H04W 72/044* (2023.01)
   *H04W 72/08* (2009.01)
   *H04W 72/20* (2023.01)
   *H04W 72/542* (2023.01)
   *H04W 72/56* (2023.01)
   *H04W 92/18* (2009.01)

(58) Field of Classification Search
   CPC ..... H04W 72/02; H04W 72/12; H04W 92/18;
                  H04W 52/0216; H04W 52/281; H04W
                  52/346; H04W 4/40; H04W 28/0278;
                  H04L 1/1812
   USPC .................................................. 370/329–330
   See application file for complete search history.

(56) References Cited

U.S. PATENT DOCUMENTS

| | | |
|---|---|---|
| 2017/0367087 A1 | 12/2017 | Seo |
| 2019/0052436 A1 | 2/2019 | Desai et al. |
| 2020/0045724 A1* | 2/2020 | Lu ........................ H04W 72/569 |
| 2021/0028891 A1* | 1/2021 | Zhou ........................ H04W 4/40 |
| 2022/0182866 A1* | 6/2022 | Lee ........................ H04L 5/0048 |

FOREIGN PATENT DOCUMENTS

| | | |
|---|---|---|
| CN | 109644458 A | 4/2019 |
| CN | 109891987 A | 6/2019 |
| CN | 110536354 A | 12/2019 |
| CN | 110831062 A | 2/2020 |
| CN | 110944390 A | 3/2020 |
| JP | 2019134196 A | 8/2019 |
| JP | 2021507017 A | 2/2021 |
| JP | 2021533690 A | 12/2021 |
| KR | 20140055720 A | 5/2014 |
| KR | 20150128387 A | 11/2015 |
| WO | 2018031172 A1 | 2/2018 |
| WO | 2018082571 A1 | 5/2018 |
| WO | 2018202159 A1 | 11/2018 |
| WO | 2020030118 A1 | 2/2020 |

OTHER PUBLICATIONS

3GPP TSG-RAN WG1 #98bis R1-1910163; Chongqing, China, Oct. 14-20, 2019.

3GPP TSG-RAN WG2 Meeting #106 R2-1906337; Reno, US, May 13-17, 2019.

Internation Search Report with English Translation for PCT/CN2019/109803 mailed Jun. 22, 2020.

3GPP TSG-RAN WG1 #98 R1-1909032; Prague, CZ, Aug. 26-30, 2019.

3GPP TSG-RAN WG1 Meeting #98 R1-1908584; Prague, CZ, Aug. 26-30, 2019.

3GPP TSG-RAN WG1 Meeting #98 R1-1908906; Prague, CZ, Aug. 26-30, 2019.

3GPP TSG-RAN WG1 Meeting #98 R1-1908638; Prague, Czech Republic, Aug. 26-30, 2019.

3GPP TSG-RAN WG1 #98 R1-1908896; Prague, CZ, Aug. 26-30, 2019.

3GPP TSG-RAN WG1 Meeting #98 R1-1908917; Prague, CZ, Aug. 26-30, 2019.

3GPP TSG-RAN WG1 #98 R1-1909257; Prague, CZ, Aug. 26-30, 2019.

3GPP TSG-RAN WG1 #98 R1-1908364; Prague, CZ, Aug. 26-30, 2019.

3GPP TSG-RAN WG1 Meeting #98 R1-1908040; Prague, Czech Republic, Aug. 26-30, 2019.

Communication pursuant to Article 94(3) EPC for EP Application 19947566.6 mailed Feb. 8, 2023. (8 pages).

Japanese Notice of Reasons for Refusal with English Translation for JP Application 2022519973 mailed Mar. 28, 2023. (10 pages).

3GPP TSG RAN WG1 #98, R1-1908668, Prague, CZ, OPPO, UCI enhancements for URLLC, Aug. 26-30, 2019. (7 pages).

Chinese First Office Action with English Translation for CN Application 2022102126441 mailed May 17, 2023. (28 pages).

Chinese Second Office Action with English Translation for CN Application 202210212644.1 mailed Jul. 27, 2023. (20 pages).

Extended European Search Report for EP Application 19947566.6 mailed Jul. 8, 2022. (8 pages).

Indian First Examination Report for IN Application 202217020169 mailed Sep. 14, 2022. (7 pages).

Notice of Deficiencies from Israel Patent Office issued in corresponding IL Patent Application 291713, dated Jun. 16, 2024, 4 pages.

Invitation To Respond To Written Opinion issued in corresponding Singapore Patent Application No. 11202203256X, dated Mar. 18, 2024, 9 pages.

* cited by examiner

WIRELESS COMMUNICATION METHOD, TERMINAL DEVICE, AND STORAGE MEDIUM

CROSS-REFERENCE TO RELATED APPLICATION(S)

This application is a continuation of International Application No. PCT/CN2019/109803, filed on Oct. 2, 2019, the entire disclosure of which is incorporated herein by reference.

TECHNICAL FIELD

Implementations of the present disclosure relate to the field of communication, and more particularly, to a wireless communication method, a terminal device, and a storage medium.

BACKGROUND

A terminal device, for example, a vehicle user equipment (VUE), may communicate with another terminal on a sidelink (SL), and may also communicate with a network device on an uplink (UL) and a downlink (DL). However, communication of the terminal device on a SL may conflict with communication of the terminal device on an UL and a DL, and/or communication of the terminal device on a SL may conflict with other communication of the terminal device on a SL, thereby affecting communication performance. How to avoid such communication conflict is an open problem.

SUMMARY

In a first aspect, a wireless communication method is provided. The method includes the following. A terminal device determines channel transmission state according to a priority of data or a signaling associated with a first channel and/or a priority of data or a signaling associated with a second channel in a case where the first channel conflicts with the second channel, where at least one of the first channel and the second channel transmits sidelink (SL) related information.

In a second aspect, a terminal device is provided. The terminal device includes a processor and a memory. The memory is configured to store computer programs. The processor is configured to invoke and execute the computer programs stored in the memory to: determine a channel transmission state according to a priority of data or a signaling associated with a first channel and/or a priority of data or a signaling associated with a second channel in a case where the first channel conflicts with the second channel, where at least one of the first channel and the second channel transmits SL related information.

In a third aspect, a computer-readable storage medium is provided. The computer-readable storage medium is configured to store computer programs which are operable with a computer to: determine a channel transmission state according to a priority of data or a signaling associated with a first channel and/or a priority of data or a signaling associated with a second channel in a case where the first channel conflicts with the second channel, wherein at least one of the first channel and the second channel transmits SL related information.

DETAILED DESCRIPTION

The following will describe technical solutions in implementations of the present disclosure with reference to the accompanying drawings. Apparently, implementations described herein are merely some implementations, rather than all implementations, of the present disclosure. For the implementations described herein, all other implementations obtained by those of ordinary skill in the art without creative effort shall fall within the protection scope of the disclosure.

Implementations of the present disclosure are applicable to any terminal-to-terminal communication framework, for example, vehicle to vehicle (V2V) communication, vehicle to everything (V2X) communication, device to device (D2D) communication, etc.

A terminal device in implementations of the present disclosure may be any device or apparatus equipped with a physical layer and a media access control (MAC) layer. The terminal device may also be referred to an access terminal, for example, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, or the like. In implementations of the present disclosure, a vehicle user equipment (VUE) is taken as an example for description, but the disclosure is not limited in this regard.

Optionally, in some implementations of the present disclosure, implementations of the present disclosure are applicable to two transmission modes, which are respectively denoted as mode A and mode B, defined in 3rd generation partnership project (3GPP).

Figure 1:
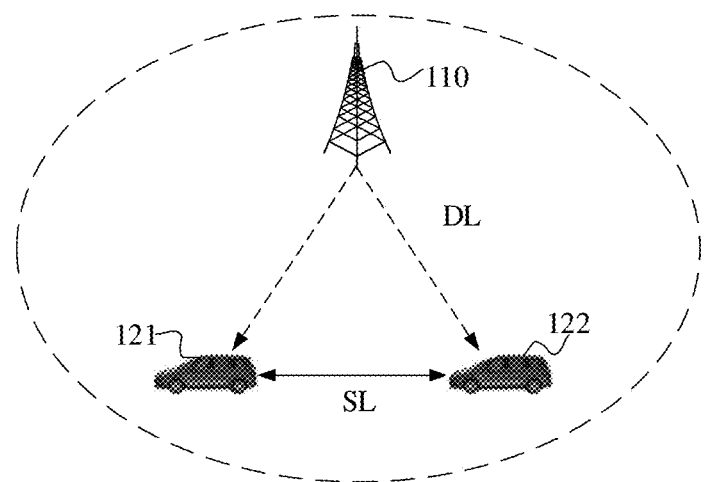
FIG. 1 is a schematic framework diagram of a transmission mode according to an implementation of the present disclosure.
Figure 2:
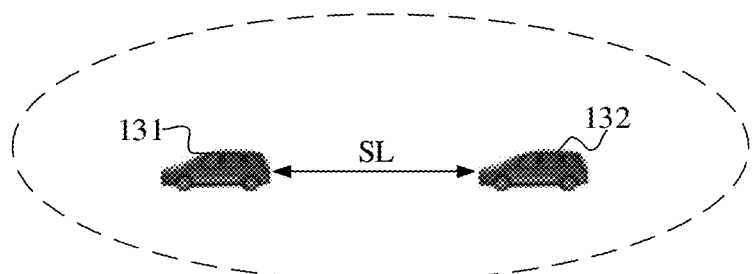
FIG. 2 is a schematic framework diagram of another transmission mode according to an implementation of the present disclosure.

FIG. 1 is a schematic diagram of mode A according to an implementation of the present disclosure. FIG. 2 is a schematic diagram of mode B according to an implementation of the present disclosure.

In mode A illustrated in FIG. 1, transmission resources of a VUE (namely VUE 121 and VUE 122) are allocated by a base station 110. The VUE can transmit data on a sidelink (SL) by using a resource allocated by the base station 110. The resource allocated by the base station 110 to a terminal device may be a resource used for a single transmission or a resource used for semi-static transmission.

In mode B illustrated in FIG. 2, the VUE (namely VUE 131 and VUE 132) can adopt a "sensing+reservation" transmission mode. The VUE can autonomously select, from SL resources, a transmission resource to transmit data.

The following will take the VUE 131 as an example for description.

The VUE 131 can acquire, through sensing, an available transmission resource set from a resource pool, and then randomly select a transmission resource from the transmission resource set to transmit data.

Since a service in an internet of vehicles (IoV) system is periodic, the VUE 131 can also adopt a semi-static transmission mode, that is, the VUE 131 can acquire a transmission resource and then continuously use the transmission resource in multiple transmission periods, which can reduce probability of resource reselection and probability of resource conflict.

The VUE 131 can carry, in control information of the current transmission, information indicative of a resource reserved for a next transmission, such that other terminal devices (such as the VUE 132) can determine, by detecting the control information, whether the resource has been reserved or used, thereby reducing probability of resource conflict.

It should be noted that, in new radio (NR)-V2X, a user may be in a mixed mode. That is, the user can acquire a resource by using mode A, and at the same time, the user can acquire a resource by using mode B.

Figure 3:
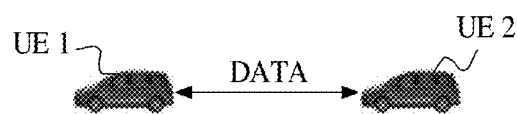
FIG. 3 is a schematic framework diagram of a unicast transmission mode according to an implementation of the present disclosure.
Figure 4:
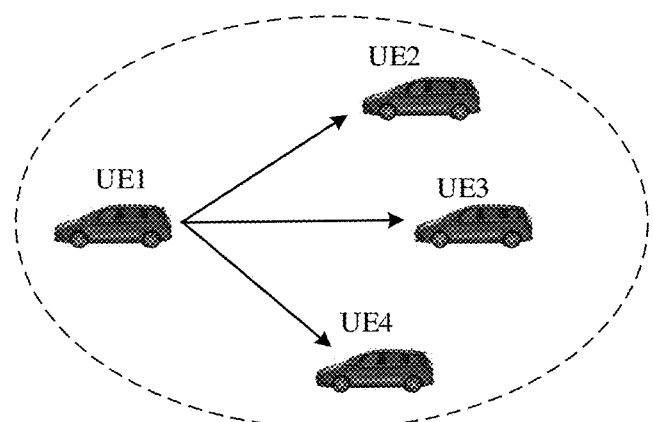
FIG. 4 is a schematic framework diagram of a multicast transmission mode according to an implementation of the present disclosure.
Figure 5:
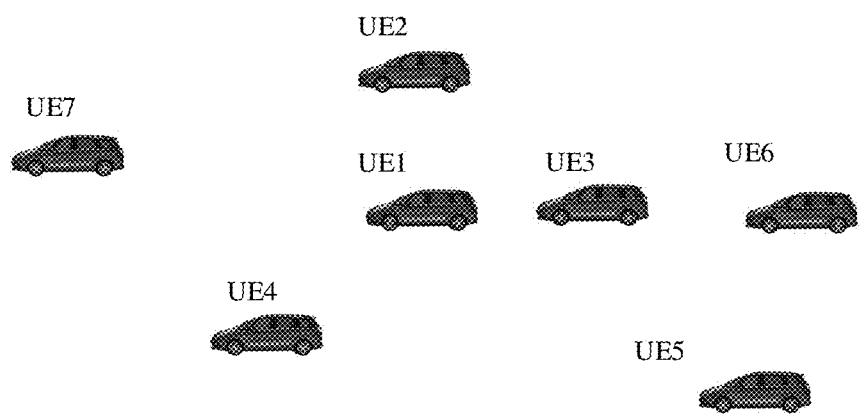
FIG. 5 is a schematic framework diagram of a broadcast transmission mode according to an implementation of the present disclosure.

In NR-V2X, a unicast transmission mode and a multicast transmission mode are introduced. For unicast transmission, there is only one receiving terminal. As illustrated in FIG. 3, UE 1 and UE 2 perform unicast transmission. For multicast transmission, all terminals in a communication group or all terminals within a certain transmission distance are receiving terminals. As illustrated in FIG. 4, UE 1, UE 2, UE 3, and UE 4 form a communication group, where UE 1 transmits data, and other terminal devices in the group are all receiving terminals. For a broadcast transmission mode, any terminal is a receiving terminal. As illustrated in FIG. 5, UE 1 is a transmitting terminal, and other terminals around are all receiving terminals.

Figure 6:
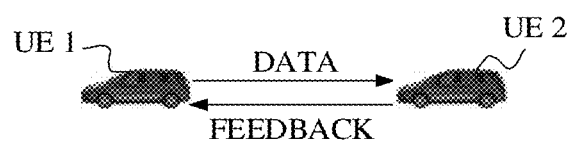
FIG. 6 is a schematic framework diagram of a unicast feedback transmission mode according to an implementation of the present disclosure.

In NR-V2X, to improve reliability, a SL feedback channel is introduced. For example, as illustrated in FIG. 6, for unicast transmission, a transmitting terminal transmits SL data, including a physical sidelink control channel (PSCCH) and a physical sidelink shared channel (PSSCH), to a receiving terminal. The receiving terminal transmits hybrid automatic repeat request (HARQ) feedback information to the transmitting terminal. The transmitting terminal determines whether retransmission is required according to the feedback information of the receiving terminal, where the HARQ feedback information is carried in a SL feedback channel, such as a physical sidelink feedback channel (PSFCH).

SL feedback can be activated or deactivated according to pre-configuration information or network configuration information. If the SL feedback is activated, the receiving terminal receives SL data transmitted by the transmitting terminal, and feeds back HARQ acknowledgement (ACK) or negative acknowledgement (NACK) to the transmitting terminal according to a detection result. The transmitting terminal determines to transmit retransmission data or new data according to the feedback information of the receiving terminal. If the SL feedback is deactivated, the receiving terminal does not need to transmit feedback information, and the transmitting terminal usually transmits data through blind retransmission. For example, instead of determining whether to transmit retransmission data based on the feedback information of the receiving terminal, the transmitting terminal repeatedly transmits each SL data K times.

The transmitting terminal may transmit to the receiving terminal a SL reference signal such as a channel state information reference signal (CSI-RS). The receiving terminal performs measurement according to the CSI-RS, and feeds back to the transmitting terminal channel state information (CSI), including a channel quantity indicator (CQI), a rank indication (RI), a precoding matrix indicator (PMI), etc. Based on the CSI fed back by the receiving terminal, the transmitting terminal can select a transmission parameter, such as a modulation and coding scheme (MCS).

In mode A, when a terminal has SL data to transmit, the terminal transmits a scheduling request (SR), a buffer status report (BSR), and other information to a network to request a transmission resource from the network. The network allocates a SL transmission resource to the terminal. The transmitting terminal transmits the SL data by using the resource, and the receiving terminal transmits to the transmitting terminal feedback information, such as HARQ ACK or NACK. The transmitting terminal needs to feed this information back to the network, and the network may determine whether the receiving terminal has correctly received the SL data, to determine whether it is necessary to allocate a transmission resource for retransmission.

In an NR-V2X system, a transmitting terminal may need to transmit the following information.

1. Uplink (UL) resource request information, UL feedback information, or UL data transmitted to the network through an UL channel, where the UL feedback information is feedback information hybrid automatic repeat request-acknowledgement (HARQ-ACK) for a physical downlink shared channel (PDSCH) of downlink (DL) data, or CSI information, etc., which specifically includes the following information:

UL SR: an UL scheduling request;
    UL BSR: an UL buffer status report;
    UL HARQ-ACK: HARQ-ACK feedback information for a DL PDSCH;
    UL CSI: channel state information obtained from CSI-RS measurement, including a CQI, an RI, a PMI, etc.;
    UL data: UL data carried on a physical uplink shared channel (PUSCH).

2. A SL resource request or SL feedback information transmitted to the network through an UL channel, which specifically includes the following information:

UL SL SR: scheduling request information transmitted to the network to request a transmission resource for SL data;

UL SL BSR: a buffer status report of SL data transmitted to the network;

UL SL HARQ-ACK: HARQ-ACK of a SL fed back to the network, where the HARQ-ACK indicates whether SL data is received correctly;

UL SL CSI: channel state information of a SL fed back to the network, including a CQI, an RI, a PMI, etc., or including a sidelink reference signal received power (SL-RSRP).

3. SL data transmitted to another terminal device through a SL channel, which specifically includes:

SL HARQ-ACK: SL feedback information, which may be carried on a PSFCH;

SL CSI: SL channel state information including a CQI, an RI, a PMI, a SL-RSRP, and other information obtained through measurement according to a SL reference signal, and transmitted to another terminal;

SL SCI: sidelink control information (SCI), which is used to schedule a PSSCH and may be carried on a PSCCH;

SL data: SL data carried on a PSSCH;

SL SSB: SL synchronization signal block, including a sidelink primary synchronization signal (S-PSS), a sidelink secondary synchronization signal (S-SSS), and a physical sidelink broadcast channel (PSBCH), etc.

Further, if terminal A can allocate SL data to terminal B, terminal B needs to transmit a SL SR, a SL BSR, and other information to terminal A through a SL.

Figure 7:
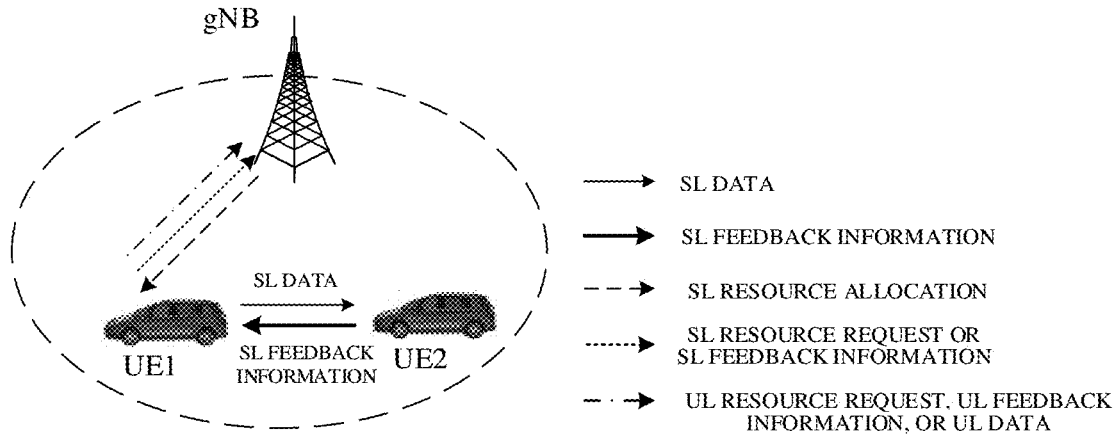
FIG. 7 is a schematic framework diagram of still another transmission mode according to an implementation of the present disclosure.

As illustrated in FIG. 7, UE 1 may transmit an UL resource request or UL feedback information to the network through an UL channel (on an UL carrier), transmit a SL resource request and SL feedback information to the network through an UL channel (on an UL carrier), and transmit SL data to UE 2 through a SL (on a SL carrier). However, if at a certain moment, UE 1 needs to transmit at least two of the above data at the same time while there is only one set of radio frequency (RF) hardware, and the RF hardware does not support simultaneous data transmission on two carriers, which data should the terminal transmit at this moment should be determined. Alternatively, the terminal has multiple sets of RF hardware, but the multiple sets of RF hardware share one power amplifier (PA). In this case, a transmission power needs to be shared among multiple pieces of data. If a total transmission power of multiple pieces of transmission data is greater than a maximum transmission power of the terminal, how to allocate a transmission power for multiple pieces of data or channels to be transmitted should be determined.

Based on the above technical problems, a wireless communication method is provided in the present disclosure. Which type of channel to transmit can be determined when two channels conflict, to avoid communication conflict between a SL and an UL and a DL and/or avoid communication conflict between SLs, thereby improving communication performance.

Figure 8:
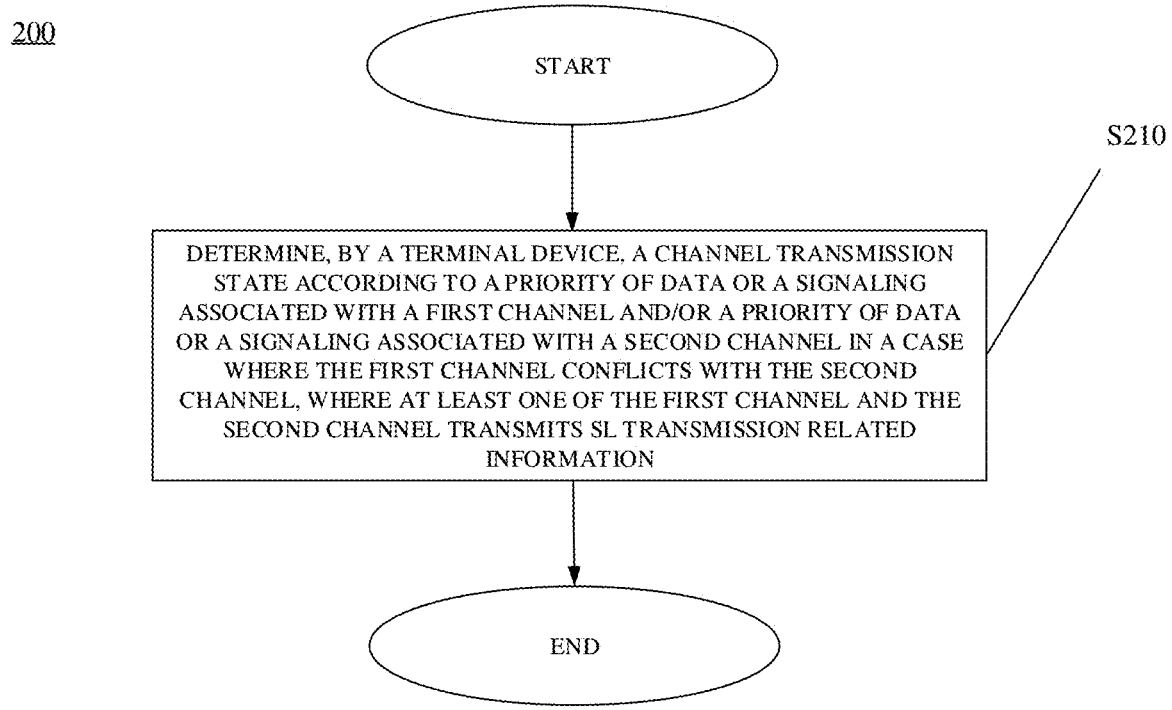
FIG. 8 is a schematic flowchart of a wireless communication method provided according to an implementation of the present disclosure.

FIG. 8 is a schematic flowchart of a wireless communication method 200 according to an implementation of the present disclosure. The method 200 may be performed by a terminal device. A terminal device illustrated in FIG. 8 may be a VUE illustrated in any of FIGS. 1 to 7.

As illustrated in FIG. 8, the method 200 may include some or all of the following.

At 5210, the terminal device determines a channel transmission state according to a priority of data or a signaling associated with a first channel and/or a priority of data or a signaling associated with a second channel in a case where the first channel conflicts with the second channel, where at least one of the first channel and the second channel transmits SL transmission related information.

It should be noted that, the conflict may occur between a SL and another SL, between a SL and an UL SL, between an UL SL and another UL SL, between a SL and an UL, or between an UL SL and an UL, but the present disclosure is not limited in this regard.

The UL SL means that SL related information is carried on an UL channel, such as a physical uplink control channel (PUCCH) or a PUSCH. For example, SL HARQ-ACK information is carried on a PUCCH, SL resource request SL SR information is carried on a PUCCH, SL BSR information is carried on a PUSCH, SL CSI is carried on a PUSCH, etc.

It should be noted that, the SL transmission related information mentioned above may be SL information, such as a SL SR, a SL BSR, SL HARQ-ACK, SL SCI, and SL data, etc. The SL transmission related information mentioned above may also be SL information fed back to the network through an UL channel, for example, the SL information is an UL SL SR, an UL SL BSR, UL SL HARQ-ACK, etc.

In implementations of the present disclosure, the priority of the data or the signaling associated with the first channel may be understood as a priority of data corresponding to a signaling transmitted on the first channel, or a priority of data transmitted on the first channel. For example, in implementations of the present disclosure, priority information of SL data associated with a channel carrying a SR and a BSR is a priority of SL data to be transmitted. For SL SCI, a priority of SL data associated with the SL SCI is a priority of SL data carried on a SL channel scheduled by the SL SCI. For a SL data channel, a priority associated with the SL data channel is a priority of SL data carried on the SL data channel. For SL HARQ-ACK, a priority associated with the SL HARQ-ACK is a priority of SL data corresponding to the HARQ-ACK.

Optionally, in implementations of the present disclosure, if the first channel is used for data or signaling transmission and the second channel is used for data or signaling transmission, the channel transmission state includes one of: transmitting the first channel preferentially or ensuring a transmission power of the first channel preferentially; transmitting the second channel preferentially or ensuring a transmission power of the second channel preferentially. For example, if a UE would simultaneously transmit on the UL and on the SL in a carrier or in two respective carriers, and the UE is not capable of simultaneous transmissions on the UL and on the SL in the carrier or in the two respective carriers, the UE may transmit only on the link, UL or SL, with the higher priority. For another example, the UE may reduce the power for the UL transmission prior to the start of the UL transmission, if the SL transmission has higher priority than the UL transmission as determined, so that the total UE transmission power would not exceed the maximum UE transmission power $P_{CMAX}$, or reduce the power for the SL transmission prior to the start of the SL transmission, if the UL transmission has higher priority than the SL transmission as determined, so that the total UE transmission power would not exceed the maximum UE transmission power $P_{CMAX}$.

It should be understood that, ensuring the transmission power of the first channel preferentially refers to that, if a total transmission power of the terminal is less than a transmission power required to transmit the first channel, the first channel is transmitted with the total transmission power, or if the total transmission power of the terminal is greater than the transmission power required to transmit the first channel, the first channel is transmitted with the transmission power required by the first channel, and the second channel is transmitted with the remaining power.

Optionally, in implementations of the present disclosure, if the first channel is used for data or a signaling transmission and the second channel is used for data or signaling reception, the channel transmission state includes one of: transmitting the first channel preferentially or ensuring a transmission power of the first channel preferentially, or receiving the second channel preferentially. If the second channel is used for data or signaling transmission and the first channel is used for data or signaling reception, the channel transmission state includes one of: transmitting the second channel preferentially or ensuring a transmission power of the second channel preferentially, or receiving the first channel preferentially.

Optionally, as implementation 1, the data or the signaling associated with the first channel is first SL information, and the data or the signaling associated with the second channel is second SL information. That is, the first channel and the second channel both carry SL related data or a SL related signaling.

For example, in implementation 1, the conflict may occur between a SL and another SL, a SL and an UL SL, or an UL SL and another UL SL.

Optionally, in implementation 1, the terminal device may specifically determine the channel transmission state as follows.

The terminal device determines the channel transmission state according to a priority associated with the first SL information and a priority associated with the second SL information, and/or the terminal device determines the channel transmission state according to an information type of the first SL information and an information type of the second SL information.

Optionally, in implementation 1, the terminal device determines to transmit the first channel preferentially or ensure a transmission power of the first channel preferentially, if the priority associated with the first SL information is higher than or equal to the priority associated with the second SL information, or optionally, the terminal device determines to transmit the second channel preferentially or ensure a transmission power of the second channel preferentially, if the priority associated with the first SL information is lower than the priority associated with the second SL information.

Optionally, the first SL information and/or the second SL information includes but is not limited to at least one of: an UL SL SR, an UL SL BSR, UL SL HARQ-ACK, a SL SR, a SL BSR, SL HARQ-ACK, SL SCI, and SL data.

The UL SL SR is carried on a PUCCH. The UL SL BSR is carried on a PUSCH. The UL SL HARQ-ACK is carried on a PUCCH or a PUSCH. The SL SR is carried on a PSCCH or a PSSCH. The SL BSR is carried on a PSSCH. The SL HARQ-ACK is carried on a PSFCH. The SL SCI is carried on a PSCCH. The SL data is carried on a PSSCH.

It should be noted that, the priority associated with the first SL information may be understood as a priority of SL data corresponding to the first SL information. For example, the first SL information is a SL BSR, and the SL BSR is for SL data 1, the priority associated with the first SL information may be understood as a priority of SL data 1. Similarly, the priority associated with the second SL information may be understood as a priority of SL data corresponding to the second SL information. For example, the second SL information is SL HARQ-ACK, and the SL HARQ-ACK is for SL data 2, the priority associated with the second SL information may be understood as a priority of SL data 2.

For example, the first SL information is first SL control information SL SCI carried on a SL channel, and the second SL information is first SL data carried on a SL channel. Priority information of the first SCI is priority information carried in the SCI or priority information corresponding to SL data scheduled by the SCI, and for example, corresponds to a priority class (or referred to as a priority value) of 4. Priority information of the first SL data is priority information corresponds to the data, and for example, corresponds to a priority class of 5. Then, a priority of the first SCI is higher than a priority of the first SL data (the lower the priority class, the higher the priority). Therefore, the first channel is transmitted preferentially, or the transmission power of the first channel is ensured preferentially.

For another example, the first SL information is first SL feedback information HARQ-ACK carried on a SL channel, and the second SL information is an UL SL BSR carried on an UL channel. A priority corresponding to the first SL feedback information HARQ-ACK is a priority of SL data corresponding to the feedback information, and for example, corresponds to a priority class of 2. A priority corresponding to the second SL information UL SL BSR is a priority of SL data to be transmitted corresponding to the SL BSR, and for example, corresponds to a priority class of 4. Then, the priority of the first SL feedback information is higher than the priority of the second SL information UL SL BSR. Therefore, the terminal transmits the first channel preferentially or ensures the transmission power of the first channel preferentially.

For another example, the first SL information is second SL feedback information UL SL HARQ-ACK, i.e., second SL feedback information HARQ-ACK carried on an UL PUCCH, and the SL feedback information is feedback information for second SL data. The second SL information is third SL feedback information UL SL HARQ-ACK, i.e., third SL feedback information HARQ-ACK carried on an UL PUCCH, and the SL feedback information is feedback information for third SL data. If the second SL data has a priority class of 5 and the third SL data has a priority class of 4, that is, a priority of the first SL information is lower than a priority of the second SL information, the terminal device transmits the second channel preferentially or ensures the transmission power of the second channel preferentially.

Optionally, in implementation 1, if the first SL information is SL feedback information HARQ-ACK and is transmitted through a SL channel, and the second SL information is also SL feedback information HARQ-ACK and is also transmitted through a SL channel, the first SL information and the second SL information may be multiplexed in one channel for transmission.

For example, if the first SL information is 1-bit HARQ-ACK information and the second SL information is 1-bit HARQ-ACK information, the first SL information and the second SL information, a total of 2 bits, may be carried on the first channel or the second channel for transmission.

Optionally, in implementation 1, if the first SL information is SL feedback information HARQ-ACK and is transmitted to the network device through UL channel transmission, and the second SL information is also SL feedback information HARQ-ACK and is also transmitted to the network device through UL channel transmission, the first SL information and the second SL information may be multiplexed in one UL channel for transmission.

For example, if the first channel is a first PUCCH and carries the first SL information which is 1-bit HARQ-ACK information, and the second channel is a second PUCCH and carries the second SL information which is 1-bit HARQ-ACK information, the first SL information and the second SL information, a total of 2 bits, may be carried on the first PUCCH or the second PUCCH for transmission to the network device.

Optionally, in implementation 1, the terminal device determines to transmit the second channel preferentially or ensure a transmission power of the second channel preferentially, if the first SL information includes a first type of SL information, and the second SL information includes a second type of SL information.

The first type of SL information includes one of: SL CSI and SL channel measurement information, and the second type of SL information includes one of: SL control information, SL data, SL feedback information, SL resource request information, and SL buffer state information.

It should be noted that, since the SL CSI and the SL channel measurement information are obtained according to a SL reference signal, there is no associated SL data and thus no priority information. The SL CSI is used for a transmitting terminal or a network side to select or configure a transmission parameter. The transmitting terminal or the network side may select or configure the transmission parameter even without the SL CSI. Therefore, when a channel for transmitting the first type of SL information conflicts with a channel for transmitting the second type of SL information, the second channel is transmitted preferentially or the transmission power of the second channel is ensured preferentially.

Optionally, in implementation 1, the terminal device determines to transmit the second channel preferentially or ensure a transmission power of the second channel preferentially, if the first SL information includes SL broadcast information or a SL synchronization signal, and the second channel carries a first type of SL information or a second type of SL information.

It should be noted that, the SL broadcast information or the SL synchronization signal are usually transmitted by multiple terminals at the same time. Therefore, even if a terminal with a transmission conflict does not transmit the SL broadcast information or the SL synchronization signal, another terminal may transmit the SL broadcast information or the SL synchronization signal. Therefore, when a channel for transmitting the SL broadcast information or the SL synchronization signal conflicts with another type of channel, the other type of channel may be transmitted preferentially.

Optionally, in implementation 1, the terminal device determines to transmit the first channel preferentially or ensure a transmission power of the first channel preferentially, if the first SL information is UL SL CSI and the second SL information is SL CSI.

The UL SL CSI is used to assist a base station to configure a SL transmission parameter. A transmission reliability requirement of a SL transmission resource allocated by a base station is usually higher than that of a SL transmission resource autonomously selected by a terminal. Therefore, the first channel is transmitted preferentially or the transmission power of the first channel is ensured preferentially.

Optionally, in implementation 1, if the first channel is a SL channel and the second channel is a SL channel, that is, if the two channels are both SL channels, implementation 1 is applicable to a situation where transmissions of the two SL channels conflict, or implementation 1 is applicable to a situation where transmission of one SL channel is conflict with reception of the other SL channel.

Optionally, in implementation 1, if the first channel is an UL channel and the second channel is an UL channel, that is, if the two channels are both UL channels, implementation 1 is applicable to a situation where transmissions of the two UL channel conflict.

Optionally, in implementation 1, if the first channel is a SL channel and the second channel is an UL channel, that is, if one channel is a SL channel and the other channel is an UL channel, implementation 1 is applicable to a situation where transmission of the SL channel conflicts with transmission of the UL channel, and/or implementation 1 is applicable to a situation where transmission of the UL channel conflicts with reception of the SL channel.

Optionally, as implementation 2, the data or the signaling associated with the first channel is SL information, and the data or the signaling associated with the second channel is UL information.

For example, in implementation 2, the conflict may occur between a SL and an UL or between an UL SL and an UL.

Optionally, in implementation 2, the terminal device may specifically determine the channel transmission state as follows.

The terminal device determines the channel transmission state according to a priority associated with the SL information, and/or the terminal device determines the channel transmission state according to a type of the SL information.

Optionally, in implementation 2, the terminal device determines to transmit the first channel preferentially or ensure a transmission power of the first channel preferentially, if the priority associated with the SL information is higher than or equal to a priority corresponding to a first threshold, or optionally, the terminal device determines to transmit the second channel preferentially or ensure a transmission power of the second channel preferentially, if the priority associated with the SL information is lower than the priority corresponding to the first threshold.

Optionally, the first threshold is pre-configured, the first threshold is configured by a network device, or the first threshold is acquired by the terminal device from another terminal device. For example, information indicating the first threshold is carried in resource pool configuration information.

For example, the first channel is a SL channel carrying SL data, and a priority of the SL channel is a priority corresponding to the SL data. For example, the SL data has a priority class of 4. The second channel is an UL channel carrying UL data. The first threshold is equal to 6, which is determined by the terminal according to network configuration information. Since the priority of the SL data is higher than a priority corresponding to the first threshold, the first channel is transmitted preferentially or the transmission power of the first channel is ensured preferentially.

For another example, the first channel is an UL channel carrying SL feedback information SL HARQ-ACK, SL data corresponding to the SL feedback information has a priority class of 7, the second channel is an UL channel carrying UL data, and the first threshold is equal to 6, which is determined by the terminal according to network configuration information. Since a priority of the SL data is lower than a priority corresponding to the first threshold, the second channel is transmitted preferentially or the transmission power of the second channel is ensured preferentially.

Optionally, in implementation 2, the terminal device determines to transmit the second channel preferentially or ensure a transmission power of the second channel preferentially, if the SL information includes a first type of SL information, where the first type of SL information includes one of: SL CSI and SL channel measurement information.

It should be noted that, since the SL CSI and the SL channel measurement information are obtained according to a SL reference signal, there is no associated SL data and thus no priority information. The SL CSI is used for a transmitting terminal or a network side to select or configure a transmission parameter. The transmitting terminal or the network side may select or configure the transmission parameter even without the SL CSI. Therefore, when a channel for transmitting the first type of SL information conflicts with a channel for transmitting the second type of SL information, the second channel is transmitted preferentially or the transmission power of the second channel is ensured preferentially.

Optionally, in implementation 2, the terminal device determines to transmit the second channel preferentially or ensure a transmission power of the second channel preferentially, if the SL information includes SL broadcast information or a SL synchronization signal.

It should be noted that, the SL broadcast information or the SL synchronization signal are usually transmitted by multiple terminals at the same time. Therefore, even if a terminal with a transmission conflict does not transmit the SL broadcast information or the SL synchronization signal, another terminal may transmit the SL broadcast information or the SL synchronization signal. Therefore, when a channel for transmitting the SL broadcast information or the SL synchronization signal conflicts with another type of channel, the other type of channel may be transmitted preferentially.

Optionally, in implementation 2, the terminal device carries first HARQ-ACK information and second HARQ-ACK information on the first channel or the second channel, if the SL information is the first HARQ-ACK information, and the UL information is the second HARQ-ACK information.

That is, the terminal device may multiplex the first HARQ-ACK information and the second HARQ-ACK information onto one channel.

Optionally, in implementation 2, if the SL information is SL feedback information HARQ-ACK and is transmitted to the network device through UL channel transmission, and the UL information is UL feedback information HARQ-ACK and is also transmitted to the network device through UL channel transmission, the SL feedback information and the UL feedback information may be multiplexed in one UL channel for transmission.

For example, if the first channel is a first PUCCH and carries the SL information which is 1-bit HARQ-ACK information, and the second channel is a second PUCCH and carries the UL information which is 1-bit HARQ-ACK information, the SL information and the UL information, a total of 2 bits, may be carried on the first PUCCH or the second PUCCH for transmission to the network device.

Optionally, in implementation 2, the terminal device determines to transmit the first channel preferentially or ensure a transmission power of the first channel preferentially, if the SL information is UL SL CSI or SL CSI, and the UL information is UL CSI.

The UL SL CSI or the SL CSI is used to assist in selection of a transmission parameter for SL data transmission, and for an IoV system, the SL data is usually safety-related information and thus has a higher importance. Therefore, the first channel is transmitted preferentially or the transmission power of the first channel is ensured preferentially.

Optionally, in implementation 2, the SL information may be at least one of: an UL SL SR, an UL SL BSR, UL SL HARQ-ACK, a SL SR, a SL BSR, SL HARQ-ACK, SL SCI, and SL data.

The UL SL SR is carried on a PUCCH. The UL SL BSR is carried on a PUSCH. The UL SL HARQ-ACK is carried on a PUCCH or a PUSCH. The SL SR is carried on a PSCCH or a PSSCH. The SL BSR is carried on a PSSCH. The SL HARQ-ACK is carried on a PSFCH. The SL SCI is carried on a PSCCH. The SL data is carried on a PSSCH.

Optionally, in implementation 2, the UL information may be at least one of: an UL SR, an UL BSR, UL HARQ-ACK, and UL data.

The UL SR is carried on a PUCCH. The UL BSR is carried on a PUSCH. The UL HARQ-ACK is carried on a PUCCH or a PUSCH. The UL data is carried on a PUSCH.

Optionally, in implementation 2, if the first channel is a SL channel and the second channel is an UL channel, that is, if one channel is a SL channel and the other channel is an UL channel, implementation 2 is applicable to a situation where transmission of the SL channel conflicts with transmission of the UL channel, and/or implementation 2 is applicable to a situation where transmission of the UL channel conflicts with reception of the SL channel.

Optionally, in implementation 2, if the first channel is an UL channel and the second channel is an UL channel, that is, if the two channels are both UL channels, implementation 2 is applicable to a situation where transmissions of the two UL channel conflict.

Therefore, in implementations of the present disclosure, the terminal device determines the channel transmission state according to the priority of the data or the signaling associated with the first channel and/or the priority of the data or the signaling associated with the second channel in a case where the first channel conflicts with the second channel. In this way, which type of channel to transmit can be determined when two channels conflict, to avoid communication conflict between a SL and an UL and a DL and/or avoid communication conflict between SLs, thereby improving communication performance.

Figure 9:
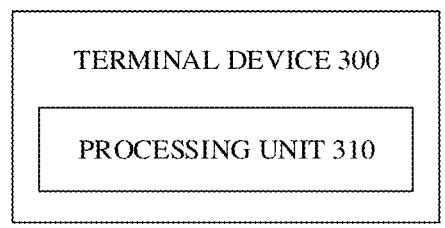
FIG. 9 is a schematic block diagram of a terminal device provided according to an implementation of the present disclosure.

FIG. 9 is a schematic block diagram of a terminal device 300 according to an implementation of the present disclosure. As illustrated in FIG. 9, the terminal device 300 includes a processing unit 310.

The processing unit 310 is configured to: determine a channel transmission state according to a priority of data or a signaling associated with a first channel and/or a priority of data or a signaling associated with a second channel in a case where the first channel conflicts with the second channel, where at least one of the first channel and the second channel transmits SL transmission related information.

Optionally, if the first channel is used for data or signaling transmission and the second channel is used for data or signaling transmission, the channel transmission state includes one of: transmitting the first channel preferentially or ensuring a transmission power of the first channel preferentially, and transmitting the second channel preferentially or ensuring a transmission power of the second channel preferentially.

Optionally, the data or the signaling associated with the first channel is first SL information, the data or the signaling associated with the second channel is second SL information, and the processing unit 310 is specifically configured to: determine the channel transmission state according to a priority associated with the first SL information and a priority associated with the second SL information, and/or determine the channel transmission state according to an information type of the first SL information and an information type of the second SL information.

Optionally, the processing unit 310 is specifically configured to: determine to transmit the first channel preferentially or ensure a transmission power of the first channel preferentially, if the priority associated with the first SL information is higher than or equal to the priority associated with the second SL information, or determine to transmit the second channel preferentially or ensure a transmission power of the second channel preferentially, if the priority associated with the first SL information is lower than the priority associated with the second SL information.

Optionally, the processing unit 310 is specifically configured to: determine to transmit the second channel preferentially or ensure a transmission power of the second channel preferentially, if the first SL information includes a first type of SL information, and the second SL information includes a second type of SL information, where the first type of SL information includes one of: SL CSI and SL channel measurement information, and the second type of SL information includes one of: SL control information, SL data, SL feedback information, SL resource request information, and SL buffer state information.

Optionally, the processing unit 310 is specifically configured to: determine to transmit the second channel preferentially or ensure a transmission power of the second channel preferentially, if the first SL information includes SL broadcast information or a SL synchronization signal, and the second channel carries a first type of SL information or a second type of SL information.

Optionally, the processing unit 310 is specifically configured to: carry first HARQ-ACK information and second HARQ-ACK information on the first channel or the second channel, if the first SL information is the first HARQ-ACK information, and the second SL information is the second HARQ-ACK information.

Optionally, the first channel is a SL channel and the second channel is a SL channel.

Optionally, the first channel is an UL channel and the second channel is an UL channel.

Optionally, the first channel is a SL channel and the second channel is an UL channel.

Optionally, the data or the signaling associated with the first channel is SL information, and the data or the signaling associated with the second channel is UL information.

The processing unit 310 is specifically configured to: determine the channel transmission state according to a priority associated with the SL information, and/or determine the channel transmission state according to a type of the SL information.

Optionally, the processing unit 310 is specifically configured to: determine to transmit the first channel preferentially or ensure a transmission power of the first channel preferentially, if the priority associated with the SL information is higher than or equal to a priority corresponding to a first threshold, or determine to transmit the second channel preferentially or ensure a transmission power of the second channel preferentially, if the priority associated with the SL information is lower than the priority corresponding to the first threshold.

Optionally, the first threshold is pre-configured, the first threshold is configured by a network device, or the first threshold is acquired by the terminal device from another terminal device.

Optionally, the processing unit 310 is specifically configured to: determine to transmit the second channel preferentially or ensure a transmission power of the second channel preferentially, if the SL information includes a first type of SL information, where the first type of SL information includes one of: SL CSI and SL channel measurement information.

Optionally, the processing unit 310 is specifically configured to: determine to transmit the second channel preferentially or ensure a transmission power of the second channel preferentially, if the SL information includes SL broadcast information or a SL synchronization signal.

Optionally, the processing unit 310 is specifically configured to: carry first HARQ-ACK information and second HARQ-ACK information on the first channel or the second channel, if the SL information is the first HARQ-ACK information, and the UL information is the second HARQ-ACK information.

Optionally, the first channel is a SL channel and the second channel is an UL channel.

Optionally, the first channel is an UL channel and the second channel is an UL channel.

It should be understood that, the terminal device 300 according to the implementation of the present disclosure may correspond to a first terminal device in method implementations of the present disclosure. The above-mentioned and other operations and/or functions of each unit in the terminal device 300 are respectively intended for implementing corresponding procedures of the terminal device in the method 200 illustrated in FIG. 8, which will not be repeated herein for the sake of simplicity.

Figure 10:
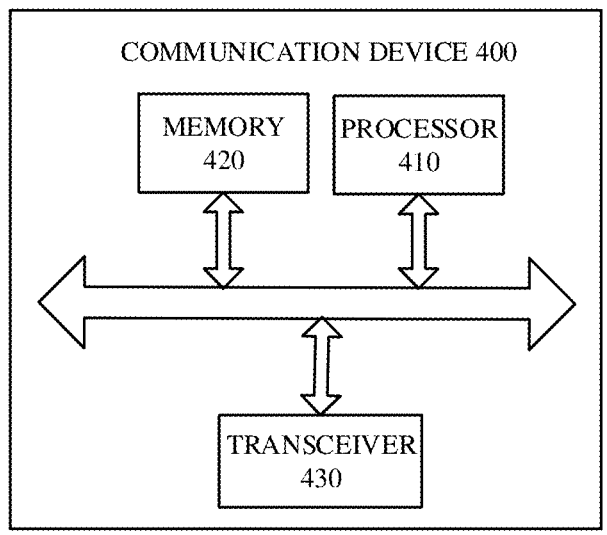
FIG. 10 is a schematic block diagram of a communication device provided according to an implementation of the present disclosure.

FIG. 10 is a schematic structural diagram of a communication device 400 provided in an implementation of the present disclosure. As illustrated in FIG. 10, the communication device 400 includes a processor 410. The processor 410 can invoke and execute computer programs stored in a memory to perform the method provided in implementations of the present disclosure.

Optionally, as illustrated in FIG. 10, the communication device 400 can further include the memory 420. The processor 410 can invoke and execute the computer programs stored in the memory 420 to perform the method provided in implementations of the present disclosure.

The memory 420 may be a separate device independent of the processor 410, or may be integrated into the processor 410.

Optionally, as illustrated in FIG. 10, the communication device 400 can further include a transceiver 430. The processor 410 can control the transceiver 430 to communicate with other devices, for example, to transmit information or data to other devices, or to receive information or data from other devices.

The transceiver 430 may include a transmitter and a receiver. The transceiver 430 may further include an antenna, where one or more antenna can be provided.

Optionally, the communication device 400 may be the network device in implementations of the present disclosure, and the communication device 400 can implement the corresponding procedures performed by the network device described in the foregoing method implementations, which will not be repeated herein for the sake of simplicity.

Optionally, the communication device 400 may be the terminal device in implementations of the present disclosure, and the communication device 400 can implement the corresponding procedures performed by the terminal device described in the foregoing method implementations, which will not be repeated herein for the sake of simplicity.

Figure 11:
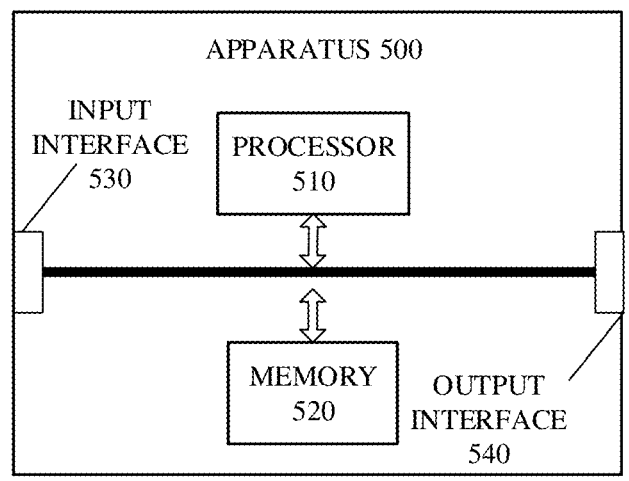
FIG. 11 is a schematic block diagram of an apparatus provided according to an implementation of the present disclosure.

FIG. 11 is a schematic structural diagram of an apparatus according to an implementation of the present disclosure. As illustrated in FIG. 11, the apparatus 500 includes a processor 510. The processor 510 is configured to invoke and execute computer programs stored in a memory to perform the method provided in implementations of the present disclosure.

Optionally, as illustrated in FIG. 11, the apparatus 500 further includes the memory 520. The processor 510 can invoke and execute the computer programs stored in the memory 520 to perform the method provided in implementations of the present disclosure.

The memory 520 may be a separate device independent of the processor 510, or may be integrated into the processor 510.

Optionally, the apparatus 500 may further include an input interface 530. The processor 510 can control the input interface 530 to communicate with other devices or chips, for example, to acquire information or data transmitted by other devices or chips.

Optionally, the apparatus 500 may further include an output interface 540. The processor 510 can control the output interface 540 to communicate with other devices or chips, for example, to output information or data to other devices or chips.

Optionally, the apparatus is applicable to the network device in implementations of the present disclosure, and the apparatus can implement the corresponding procedures performed by the network device described in the foregoing method implementations, which will not be repeated herein for the sake of simplicity.

Optionally, the apparatus is applicable to the terminal device in implementations of the present disclosure, and the apparatus can implement the corresponding procedures performed by the terminal device described in the foregoing method implementations, which will not be repeated herein for the sake of simplicity.

Optionally, the apparatus mentioned in implementations of the present disclosure may also be a chip, for example, may be a system-level chip, a system chip, a chip system, or an on-chip system chip.

Figure 12:
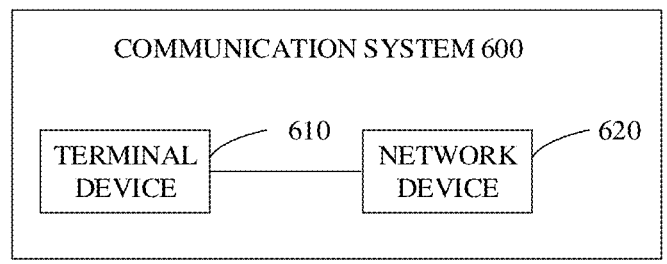
FIG. 12 is a schematic block diagram of a communication system provided according to an implementation of the present disclosure.

FIG. 12 is a schematic block diagram of a communication system 600 provided in an implementation of the present disclosure. As illustrated in FIG. 12, the communication system 600 includes a terminal device 610 and a network device 620.

The terminal device 610 may be configured to implement the corresponding functions implemented by a terminal device in the above methods, and the network device 620 may be configured to implement the corresponding functions implemented by a network device or a base station in the above methods, which will not be repeated herein for the sake of simplicity.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or perform the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations of the present disclosure may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link dynamic random access memory (synch-link DRAM, SLDRAM), and a direct rambus RAM (DRRAM). It should be noted that, the memory of systems and methods described herein is intended to include, but is not limited to, these and any other suitable types of memories.

It should be understood that, the above description of the memory is intended for illustration rather than limitation. For example, the memory of implementations may also be an SRAM, a DRAM, an SDRAM, a DDR SDRAM, an ESDRAM, a SLDRAM, a DR RAM, etc. In other words, the memory of implementations is intended to include, but is not limited to, these and any other suitable types of memory.

Implementations of the present disclosure further provide a computer-readable storage medium. The computer-readable storage medium is configured to store computer programs.

Optionally, the computer-readable storage medium is applicable to the network device or base station of implementations of the present disclosure. The computer programs are operable with a computer to implement the corresponding procedures performed by the network device or base station described in the foregoing method implementations, which will not be repeated herein for the sake of simplicity.

Optionally, the computer-readable storage medium is applicable to the mobile terminal/terminal device of implementations of the present disclosure. The computer programs are operable with a computer to implement the corresponding procedures performed by the mobile terminal/terminal device described in the foregoing method implementations, which will not be repeated herein for the sake of simplicity.

Implementations of the present disclosure further provide a computer program product. The computer program product includes computer program instructions.

Optionally, the computer program product is applicable to the network device or base station of implementations of the present disclosure. The computer program instructions are operable with a computer to implement the corresponding procedures by the network device or base station described in the foregoing method implementations, which will not be repeated herein for the sake of simplicity.

Optionally, the computer program product is applicable to the mobile terminal/terminal device of implementations of the present disclosure. The computer program instructions are operable with a computer to implement the corresponding procedures performed by the mobile terminal/terminal device described in the foregoing method implementations, which will not be repeated herein for the sake of simplicity.

Implementations of the present disclosure further provide a computer program.

Optionally, the computer program is applicable to the network device or base station of implementations of the present disclosure. The computer program, when executed by a computer, is operable with the computer to implement the corresponding procedures performed by the network device or base station described in the foregoing method implementations, which will not be repeated herein for the sake of simplicity.

Optionally, the computer program is applicable to the mobile terminal/terminal device of implementations of the present disclosure. The computer program, when executed by a computer, is operable with the computer to implement the corresponding procedures performed by the mobile terminal/terminal device described in the foregoing method implementations, which will not be repeated herein for the sake of simplicity.

Those of ordinary skill in the art will appreciate that units and algorithmic operations of various examples described in connection with implementations of the present disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations of the present disclosure may also be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in implementations of the present disclosure may be integrated into one processing unit or may be present as a number of physically separated units, and two or more units may be integrated into one.

If the integrated units are implemented as software functional units and sold or used as standalone products, they may be stored in a computer-readable storage medium. For such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless communication method, comprising:
   determining, by a terminal device, a channel transmission state according to a priority of data or a signaling associated with a first channel and/or a priority of data or a signaling associated with a second channel in a case where the first channel conflicts with the second channel, wherein at least one of the first channel and the second channel transmits sidelink (SL) related information, the first channel is an UL channel and the second channel is an UL channel, the data or the signaling associated with the first channel is SL information, the data or the signaling associated with the second channel is UL information, and
   determining, by the terminal device, the channel transmission state according to the priority of the data or the signaling associated with the first channel and/or the priority of the data or the signaling associated with the second channel, comprising:
      determining, by the terminal device, the channel transmission state according to a priority associated with the SL information.

2. The method of claim 1, wherein based on a determination that the first channel is used for data or signaling transmission and the second channel is used for data or signaling transmission, the channel transmission state comprises one of:
   transmitting the first channel or ensuring a transmission power of the first channel; and
   transmitting the second channel or ensuring a transmission power of the second channel.

3. The method of claim 1, wherein determining, by the terminal device, the channel transmission state according to the priority associated with the SL information, comprises:
   determining, by the terminal device, to transmit the first channel or ensure a transmission power of the first channel, based on a determination that the priority associated with the SL information is higher than a priority corresponding to a first threshold; or determining, by the terminal device, to transmit the second channel or ensure a transmission power of the second channel, based on a determination that the priority associated with the SL information is lower than the priority corresponding to the first threshold.

4. The method of claim 3, wherein the first threshold is pre-configured, or the first threshold is configured by a network device.

5. A terminal device, comprising:
a memory configured to store computer programs; and
a processor configured to invoke and execute the computer programs stored in the memory to enable the terminal device to:
determine a channel transmission state according to a priority of data or a signaling associated with a first channel and/or a priority of data or a signaling associated with a second channel in a case where the first channel conflicts with the second channel, wherein at least one of the first channel and the second channel transmits sidelink (SL) related information, the first channel is an UL channel and the second channel is an UL channel, the data or the signaling associated with the first channel is SL information, the data or the signaling associated with the second channel is UL information, and
the processor is specifically configured to:
determine the channel transmission state according to a priority associated with the SL information.

6. The terminal device of claim 5, wherein based on a determination that the first channel is used for data or signaling transmission and the second channel is used for data or signaling transmission, the channel transmission state comprises one of:
transmitting the first channel or ensuring a transmission power of the first channel; and
transmitting the second channel or ensuring a transmission power of the second channel.

7. The terminal device of claim 5, wherein the processor is specifically configured to:
determine to transmit the first channel or ensure a transmission power of the first channel, based on a determination that the priority associated with the SL information is higher than a priority corresponding to a first threshold; or
determine to transmit the second channel or ensure a transmission power of the second channel, based on a determination that the priority associated with the SL information is lower than the priority corresponding to the first threshold.

8. The terminal device of claim 7, wherein the first threshold is pre-configured, or the first threshold is configured by a network device.

9. A non-transitory computer-readable storage medium configured to store computer programs which are operable with a computer to enable the computer to:
determine a channel transmission state according to a priority of data or a signaling associated with a first channel and/or a priority of data or a signaling associated with a second channel in a case where the first channel conflicts with the second channel, wherein at least one of the first channel and the second channel transmits sidelink (SL) related information, the first channel is an UL channel and the second channel is an UL channel, the data or the signaling associated with the first channel is SL information, the data or the signaling associated with the second channel is UL information, and
the computer programs are operable with the computer to enable the computer to:
determine the channel transmission state according to a priority associated with the SL information.

* * * * *